United States Patent
Kelly

[15] 3,696,461
[45] Oct. 10, 1972

[54] CARPET INSTALLATION SYSTEM FOR USE IN AN AIRCRAFT

[72] Inventor: Robert G. Kelly, 96 University Heights Drive, Stony Brook, N.Y. 11790

[22] Filed: July 28, 1969

[21] Appl. No.: 845,289

[52] U.S. Cl. .................................................16/16
[51] Int. Cl. .............................................A47g 27/04
[58] Field of Search.......................................16/16, 4

[56] References Cited

UNITED STATES PATENTS

| | | | |
|---|---|---|---|
| 3,543,326 | 12/1970 | Rohrberg et al. | 16/16 |
| 2,796,624 | 6/1957 | Speer | 16/16 |
| 2,996,751 | 8/1961 | Roby et al. | 16/16 |
| 3,254,361 | 6/1966 | Brunn et al. | 16/16 |

*Primary Examiner*—Bobby R. Gay
*Assistant Examiner*—Doris L. Troutman
*Attorney*—Leonard H. King

[57] ABSTRACT

For use in an aircraft, a carpet installation system comprising a plurality of longitudinally extending extrusions, having laterally extending flange means, is provided for retaining the carpets so that the carpets may be readily removed for cleaning or replacement.

2 Claims, 7 Drawing Figures

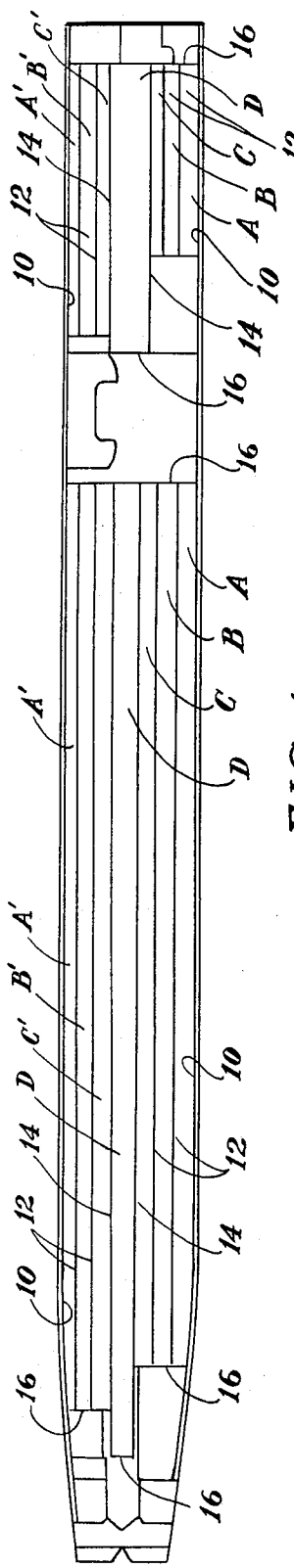
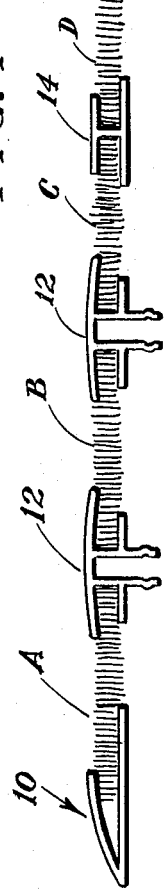
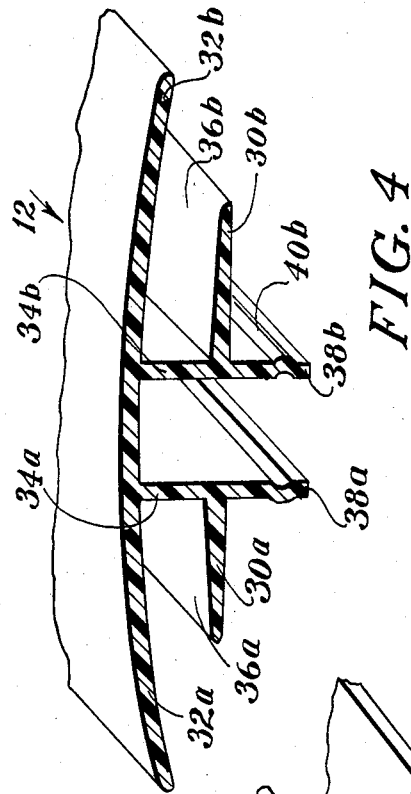

PATENTED OCT 10 1972

INVENTOR.
ROBERT G. KELLY
BY
Leonard H. King
ATTORNEY

3,696,461

CARPET INSTALLATION SYSTEM FOR USE IN AN AIRCRAFT

This invention relates generally to carpet retaining means and more particularly to a system for removably retaining strips of carpeting in an aircraft cabin.

BACKGROUND OF THE INVENTION

Commercial aircraft of the type presently in use generally provide floor covering such as carpeting in the passenger compartment of the aircraft. Particular problems are involved in the use of carpeting in an aircraft in that, in addition to heavy pedestrian traffic, provision must be made for periodically removing the carpet from the passenger compartment when cleaning or replacement thereof is required. Speed in removing and replacing the carpet is essential since valuable revenue is lost when the aircraft is out of service.

One well-known commercial airline requires replacement of the entire carpeting in each of its aircraft on the average of once a month. Where a high-grade quality wool carpeting is used the frequent washing results in shrinkage that makes it difficult, if not impossible, to reinstall the carpeting. This would necessarily create an unnecessary expense in many instances where only particular strips of more heavily trafficed carpeting may be washed.

Presently, installation of carpeting in aircraft is achieved with a double surfaced adhesive tape, that is, one surface of the tape is adhered to the deck while the other surface of the tape is adapted to adhesively retain the underside of the carpeting. It will be readily appreciated that this form of installation is relatively expensive and furthermore, can frequently result in an imperfect installation of the carpeting. Because the tape must necessarily have good adhesion qualities in order to securely retain the carpet, it is difficult to stretch the carpet such as by "kicking" once the carpet has been touched down on the adhesive. Further, with each monthly carpet installation it would be necessary to reapply the adhesive strips. It will be evident that the foregoing problems will be multiplied in the very near future when the extremely large jet airlines come into use. The new aircraft can carry between three and four hundred people. Accordingly, the carpeting will be abused to a much greater extent and therefore even more carpeting will have to be replaced more frequently. In order to operate the aircraft economically, however, a minimum of time can be allowed for the aircraft to be out of service. For this reason means must be provided for removing a reinstalling a carpet in the most expeditious manner. The present invention provides just such means, as will be described hereinafter.

In its broadest aspect the present invention provides a system that includes a plurality of extruded strips extending longitudinally in the passenger compartment of the aircraft. Certain ones of the strips are used along the outboard edges of the deck. Still other strips included within the systems are used in the area or areas of the seats. The center or aisle carpets are retained by still further strips and the transverse ends of the narrow lengths of carpet are secured by saddles extending transversely in the passenger compartment. The present invention teaches the use of either one or both of two different saddles, one of which is adapted to retain both a permanent carpet and a removable carpet; whereas the other one of the saddles is adapted to retain adjacent edges of two removable carpets.

The present invention is particularly characterized by the absence of any means to fasten the carpet to the longitudinally extending extrusions. A "tackless" carpet strip secures the ends of the carpet lengths to the saddles. Since the bulk of the movement of the carpet will be in the fore and aft directions, only the transverse ends need be gripped by conventional means. There will normally be very little lateral movement so that the stiffness of the relatively narrow strips of carpeting can be relied on to keep them in the longitudinal receptacles that will be described in greater detail hereinafter. This arrangement permits longitudinal insertion and removal of the carpet strips.

Accordingly, it is a primary object of the present invention to provide an improved system for installing carpet in an aircraft.

It is another object of this invention to provide a carpet installation system for an aircraft wherein different longitudinally extending strips are used to releasably retain relatively narrow widths of carpeting along the longitudinal edges thereof.

It is a further object of this invention to provide a carpet installation system as described above wherein the narrow widths of carpeting are readily removable by sliding them out of longitudinally disposed retaining means.

Still another object of the present invention is to provide a carpet installation system for aircraft, as described above, wherein the carpet retaining strips are formed by an extrusion process.

Still another object of the present invention is to provide a carpet installation system for aircraft utilizing carpet retaining strips extruded from plastic.

An advantage of the present invention is that the narrow widths of carpeting used in an aircraft passenger compartment are readily removable on an individual basis. A feature of this invention is that the aircraft carpet installation system is readily adaptable to a wide variety of aircraft passenger compartment configurations.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing, like reference characters designate like parts.

BRIEF DESCRIPTION OF THE DRAWING

FIG. 1 is a schematic plan view of the interior of the passenger compartment of a typical, commercial aircraft with the seats and other non-essential elements removed for clarity to disclose the physical relationship of the extruded elements comprising the system of the present invention;

FIG. 2 is a typical transverse sectional view illustrating the relationship of the components of the present invention with respect to each other and with respect to the interior side walls of the passenger compartment;

FIG. 3 is a sectional, transverse perspective elevational view illustrating one of the components comprising the present invention;

FIG. 4 is a perspective transverse sectional view in elevation of another compartment comprising the system of this invention;

Before discussing the structure of the present invention it would be well to define some of the terms that will be used hereinafter. Except for the saddle components the remainder of the elements will be described as extending longitudinally and with flanges that extend both longitudinally and laterally. These directions are taken with respect to the longitudinal axis of the aircraft. That is, with the exception of the saddles, the remainder of the components run fore and aft, generally parallel to the longitudinal axis of the aircraft and the flanges extend longitudinally as well as transversely thereof or in the direction of the port or starboard sides of the aircraft.

Turning now to FIGS. 1 and 2, there is shown a passenger compartment of a typical commercial airliner. There is provided a center aisle in this particular aircraft on each side of which are rows of seats. In some aircraft there may be two seats on one side and three on the other or there may be three on each side of the center aisle. The exact configuration of the new large-size aircraft will, of course, be different and conceivably there may be more than one aisle if the seating is, for example, eight abreast. The present invention provides extrusion means for retaining the two longitudinal edges of the center aisle or aisles. In addition, extrusion means are provided for the longitudinal edges of the narrow strips of carpeting that run from fore to aft under the seats. Still other extrusion means are provided by the present invention to retain the outside edges of the port and starboard strips of carpeting.

Figure 6:
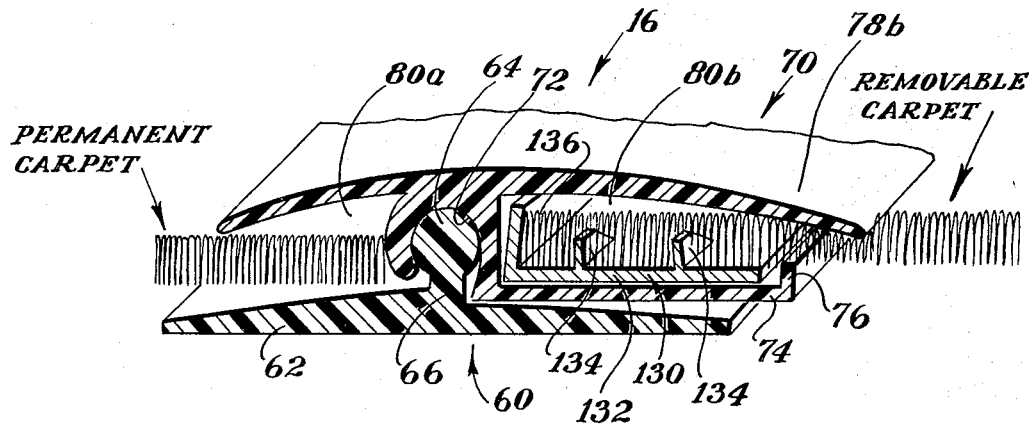
FIG. 6 is a perspective transverse elevational view in section illustrating one embodiment of a saddle that may be used as a transition piece between a permanent carpet and a removable carpet.

As shown particularly in FIG. 2, a first extrusion 10 is provided on the port and starboard sides of the aircraft. Immediately inward thereof, and depending upon the number of seats abreast, one or more of a second type of extrusion 12 is provided longitudinally in the passenger compartment. A third type of extrusion 14 is provided longitudinally in the passenger compartment to retain the elongated side edges of the center strip of carpeting. Finally, the transverse ends of each of the strips of carpeting are finished off with a saddle type extrusion 16, one embodiment of which is shown in FIG. 6.

It will be seen in FIG. 3 that the port and starboard extrusions 10 are comprised of a base portion 20 and a top flange 22 joined to the base portion at junction 24. While both the base 20 and the flange 22 extend longitudinally in the passenger compartment, they are also laterally disposed with respect to the side walls of the passenger compartment. A receptacle 26 is defined by opposed surfaces of the base 20 and the flange 22 for the outboard longitudinal edges of the carpet strips labeled A, A' in FIGS. 1 and 2.

FIG. 4 illustrates in perspective cross-section the extruded member 12 that is to be used to retain the narrow width of carpets B, B' that extends longitudinally in the passenger compartment underneath the seats. The member 12 is comprised of longitudinally and laterally extending lower bases 30a and 30b and longitudinally and laterally extending upper flanges 32a and 32b. The upper and lower bases and flanges are spaced vertically from each other by means of a pair of longitudinally extending posts 34a and 34b so that receptacles 36a and 36b are defined therebetween to receive the longitudinal edges of the narrow widths of carpeting B, B' and C, C' that extend under the seats. The bases 30a and 30b are adapted to rest or be seated on the deck of the passenger compartment and the upper flanges 32a and 32b are preferably formed as a continuous member.

The posts 34a and 34b are also provided with downward extensions 38a and 38b that include longitudinally extending ribs 40a and 40b, respectively. The downward extensions 38a and 38b and the ribs 40a and 40b thereon are adapted to be received in appropriately sized, shaped and located recesses or seat tracks that extend longitudinally in the aircraft deck (not shown). The construction of the lower portion of members 12 permit their rapid insertion and removal in the seat tracks whenever it is required.

Figure 5:
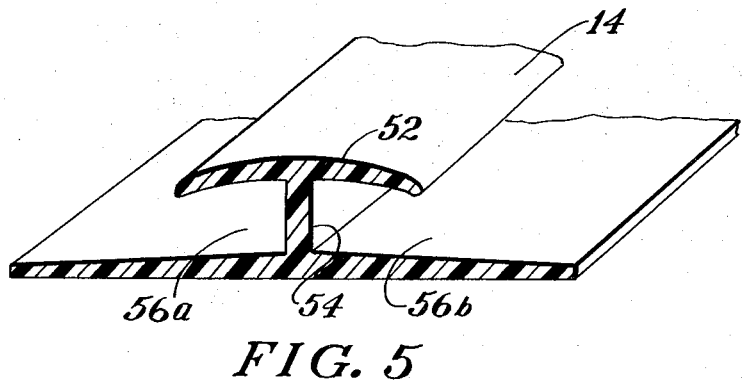
FIG. 5 is a perspective transverse sectional view in elevation illustrating still another component comprising the carpet installation system of the present invention.

The center aisle carpet D, as well as the inboard edge of the inboard strips of carpeting C, C' beneath the seats is retained by an extruded member 14. This member is shown in more detail in FIG. 5. The member 14 is comprised of a longitudinally and laterally extending base 50 adapted to be seated on the deck of the passenger compartment and a longitudinally and laterally extending upper flange 52 spaced from the base 50 by means of a post 54 that extends longitudinally in the passenger compartment. Receptacles 56a and 56b for the carpet edges are defined by the confronting surface of the base 50, the upper flange 52 and the longitudinal post 54. The receptacles 56a and 56b are adapted to retain the longitudinal edges of the carpet strips labeled C, C' and D in FIGS. 1 and 2.

The transverse ends of the longitudinal strips of carpeting are finished off by extruded transverse saddle assemblies, such as a saddle 16 shown in FIG. 6. The saddle 16 is comprised of a first extruded member 60 having a longitudinally and laterally extending base portion 62 that is adapted to be suitably secured to the deck of the passenger compartment. A rib 64 is spaced upwardly from the base section 62 and runs in a longitudinal direction. In the embodiment illustrated, the rib 64 defines, in cross-section, almost a complete circle and is spaced from the base portion 62 by a post 66.

The saddle 16 further includes an extruded top member 70 comprised of a downwardly opened recess 72 that is sized and shaped so as to removably engage the rib 64 of the first saddle member 60. The top member 70 further includes a single lateral flange 74 having an upwardly turned lip 76 at the outer or free end thereof, the flange 74 being adapted to seat on the base portion 62 in the assembled condition. A top flange comprised of longitudinally and laterally extending portions 78a and 78b complete the upper member 70. Receptacles 80a and 80b are defined by confronting surfaces of the upper and lower members 70 and 60, respectively, and as will be explained in more detail hereinafter, permits the members 16 to be used as a transition piece between a permanent carpet and removable carpet.

Figure 7:
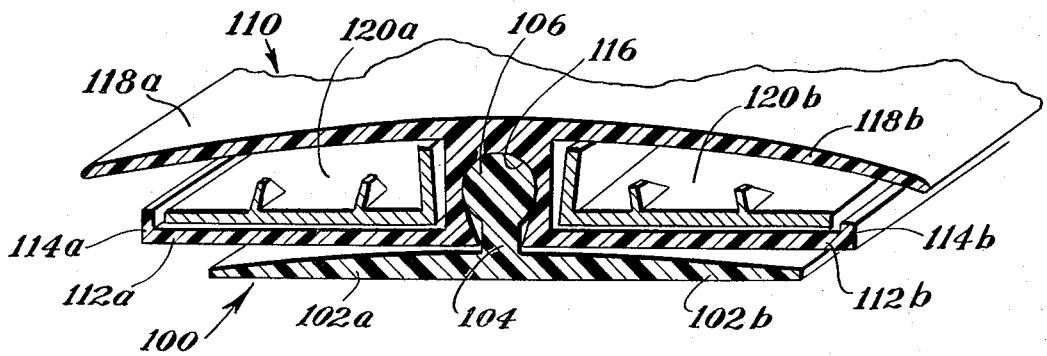
FIG. 7 is a perspective elevational view in section, similar to FIG. 6 but illustrating a form of one of the components of this invention that may be utilized as a transition piece between two removable carpets.

An alternative embodiment of the saddle is shown in FIG. 7. Saddle 100 is comprised of a base member which includes laterally and longitudinally extending flanges 102a and 102b that are adapted to be secured to the deck of the passenger compartment. A centrally located post 104 extends upwardly from the flanges 102a and 102b and supports a rib 106 that is substantially circular in cross-section. The upper portion 110 of the saddle 100 is comprised of a pair of laterally and longitudinally extending flanges 112a and 112b each of which has an upwardly extending lip 114a and 114b at the free end thereof. A downwardly opened recess or socket 116 that is adapted to removably engage the rib 106 is provided intermediate the flanges 112a and 112b. The upper member 110 also includes laterally and longitudinally extending flanges 118a and 118b that are spaced from the flanges 112a and 112b to define receptacles 120a and 120b which in this embodiment are adapted to receive the edges of two removable pieces of carpet.

Turning now once again to FIGS. 6 and 7, it will be seen that a perforated metal strip 130 is positioned in each of the receptacles 80b, 120a and 120b. The purpose of this strip 130 is to provide the conventional "trackless" carpeting. The strip 130 is comprised of a first leg 132 adapted to rest on the base members 62, 112a and 112b of the saddles 16 and 100, respectively, and to be contained by the lips 76, 114a and 114b. The strips 130 are further provided with upwardly extending projections 144 and a second leg 136 extending the length thereof. The transverse end edges of the strips of carpet abut the second leg 136 and the backing of the carpet strips is gripped by the projections 134.

Thus, it will be seen that the extrusions 10, 12 and 14 are characterized by the absence of conventional carpet gripping means and that the carpet strips A, A', B, B', C, C' and D, D', may be slidably inserted and are slidably removable from the receptacles 26, 36a, 36b, 56a and 56b, provided in extrusions 10, 12 and 14, respectively. Further, it will be noted that extrusions 10, 14, 16 and 100 are adapted to be fastened, either permanently or removably, by suitable fasteners to the deck of the passenger compartment by driving the fasteners through the base members of the respective extrusions. However, extrusion 12 is snapped into a suitably sized and shaped track or tracks formed longitudinally in the deck of the passenger compartment.

It will therefore be appreciated that the long and relatively narrow strips of carpeting that heretofore have been difficult to install and remove may now be slipped into and removed from the receptacles formed in the elongated, longitudinally extending extrusions described above. The transverse saddle members provide means for grippingly retaining the ends of the carpet strips and also provide means for the conventional "kicking" of the carpet in order to minimize wrinkles and the like. Thus, installation of carpeting on commercial airliners has been substantially simplified and the cost thereof reduced.

There has been disclosed heretofore the best embodiment of the invention presently contemplated. However, it is to be understood that various changes and modifications may be made for those skilled in the art without departing from the spirit of the invention.

What I claim as new and desire to secure by Letters Patent is:

1. A carpet installation system for use in the passenger compartment of an aircraft, said system comprising:
   a. a plurality of longitudinally extending extrusion means adapted to be mounted on the deck of the passenger compartment;
   b. receptacle means extending longitudinally and laterally in each said extrusion means, said receptacle means being characterized by the absence of conventional carpet retaining means and adapted to receive the longitudinal edges of the carpet; and
   c. extruded saddle means adapted to be transversely mounted on the deck of the passenger compartment; and said saddle means comprising an assembly including a base member adapted to be mounted on the deck of the passenger compartment, first coupling means integral with and extending upwardly from said base member, a longitudinal top flange including integral second coupling means releasably engaged with said first coupling means, a longitudinal bottom flange integral with and spaced downwardly from said top flange and extending in a lateral direction away from said first and second coupling means to define first receptacle means; and a first carpet gripping member positioned in said first receptacle means.

2. The system in accordance with claim 1 wherein said top flange includes a second longitudinal bottom flange integral with and spaced downwardly from said top flange and extending in a lateral direction away from said first and second coupling means and said first bottom flange to define second receptacle means and second carpet gripping means positioned in said second receptacle means.

* * * * *